United States Patent
Mori et al.

[19]

[11] Patent Number: 5,910,261
[45] Date of Patent: Jun. 8, 1999

[54] LASER MACHINING DEVICE AND LASER MACHINING METHOD OF A ROUND HOLE

[75] Inventors: Atsushi Mori; Yoshinori Nakata, both of Yamanishi, Japan

[73] Assignee: Fanuc, Ltd., Yamanishi, Japan

[21] Appl. No.: 08/849,149

[22] PCT Filed: Oct. 2, 1996

[86] PCT No.: PCT/JP96/02862

§ 371 Date: May 29, 1996

§ 102(e) Date: May 29, 1996

[87] PCT Pub. No.: WO97/12717

PCT Pub. Date: Apr. 10, 1997

[30] Foreign Application Priority Data

Oct. 2, 1995 [JP] Japan .................................. 7-254883

[51] Int. Cl.⁶ .................................................. B23K 26/00
[52] U.S. Cl. .................... 219/121.71; 219/121.7
[58] Field of Search ........................... 219/121.7, 121.71, 219/121.61, 121.62, 121.85, 121.67, 121.72; 364/474.08

[56] References Cited

U.S. PATENT DOCUMENTS

| | | | |
|---|---|---|---|
| 5,012,069 | 4/1991 | Arai | 219/121.62 |
| 5,632,913 | 5/1997 | Mori | 219/121.61 |
| 5,688,418 | 11/1997 | Yoshiyasu et al. | 218/121.7 |

FOREIGN PATENT DOCUMENTS

| | | | |
|---|---|---|---|
| 0 696 493 A1 | 2/1996 | European Pat. Off. . | |
| 57-206588 | 12/1982 | Japan | 219/121.85 |
| 4-63616 | 2/1992 | Japan . | |
| 5-19825 | 1/1993 | Japan . | |
| 5-297930 | 11/1993 | Japan . | |
| 7-232288 | 9/1995 | Japan . | |

OTHER PUBLICATIONS

Supplemental European Search Report for European Application No. EP 96 93 2798, dated Oct. 21, 1998.

*Primary Examiner*—Geoffrey S. Evans
*Attorney, Agent, or Firm*—Staas & Halsey

[57] ABSTRACT

In a laser machining device for cutting a round hole in a workpiece employing a machining program, a movement path includes a section from point $P_1$ to point $P_2$ (passing a hole previously formed in a workpiece) and reaches point $P_3$ on a circle (40) to be cut. A section $P_2$-$P_3$ of the path is not a simple circular arc but is a curve whose radius of curvature gradually becomes approximate to the radius of a circle 40 to be cut as it gradually decreases towards the end point ($P_3$) from the start point ($P_2$) where the radius of the curvature is largest. Thus, the change in acceleration at points $P_2$ and $P_3$ of the section $P_1$-$P_2$-$P_3$ of the path can be controlled to low levels.

6 Claims, 8 Drawing Sheets

LASER MACHINING DEVICE AND LASER MACHINING METHOD OF A ROUND HOLE

TECHNICAL FIELD

The present invention relates to a laser machining device and a laser machining method for cutting a workpiece to a predetermined curved shape such as a round-hole shape or the like in accordance with a machining program.

BACKGROUND ART

When a workpiece having a plate-like shape is cut and a round hole is perforated by a laser machining device, piercing is carried out firstly on the periphery of a circle or the inside of a circle. Piercing means an operation for making a hole penetrating the plate-like workpiece at a start point of cutting. Laser beam is irradiated along a circle (circle to be cut) of the object starting from the hole perforated by the piercing operation.

In the case of a thin steel plate, a hole can be perforated instantaneously by irradiation of laser beam. Therefore, in machining a thin steel plate, piercing can be made by ON/OFF of laser beam while a machining head is moving. Further, a path leading to the circle to be cut out can be reached by smoothly moving a machine head from a position of pierced hole, and the circle can be cut out without stopping the machine head by providing some overlapping cutting path beginning from the end point of the cutting path.

Figure 8:
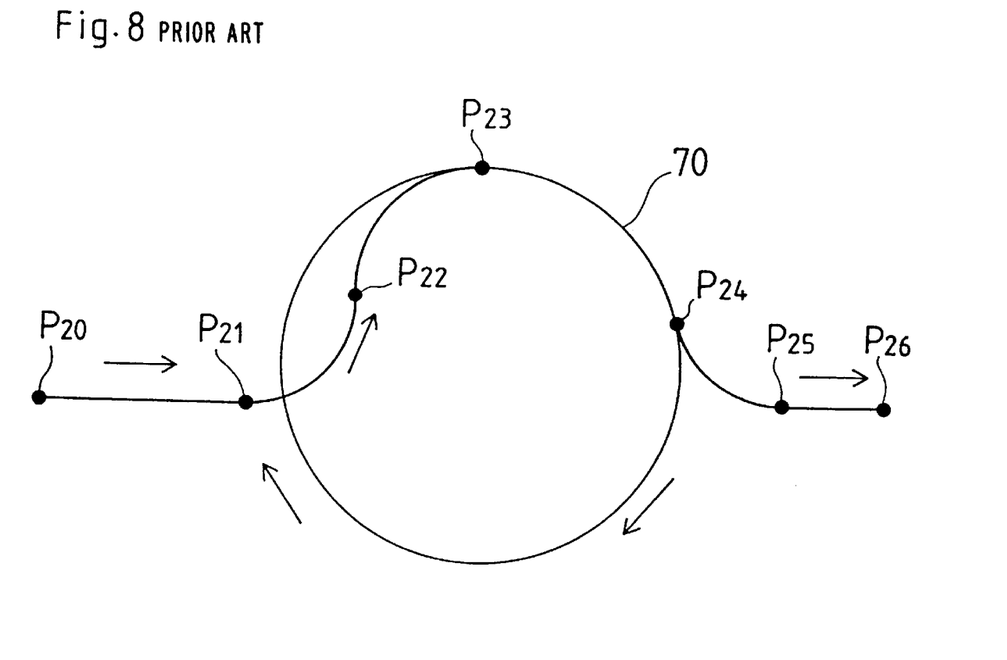
FIG. 8 is a view showing a cutting path of a conventional perforating process.

FIG. 8 illustrates a cutting path of a conventional circular hole cutting operation. According to this example, the position of a machining head before starting the cutting operation for a round hole 70 is set to point $P_{20}$, and a start point for machining a shape to be machined next to the round hole 70 is set to point $P_{26}$. The position of piercing is set to $P_{22}$.

In respect of the movement path in this case, straight line movement is made for a segment from point $P_{20}$ to point $P_{21}$, a circular arc movement in the counterclockwise direction is made for a segment from point $P_{21}$ to point $P_{22}$. A circular movement in the clockwise direction is made for a segment from point $P_{22}$ to point $P_{23}$. Output of a laser beam is started at point $P_{22}$. A circular movement in the clockwise direction is conducted from point $P_{23}$ along the round hole (circle to be cut) 70 until the movement makes a round and returns to point $P_{23}$. A circular movement for an overlapped path is made from point $P_{23}$ to point $P_{24}$, thereby forming the round hole 70.

A circular movement is conducted from point $P_{24}$ to point $P_{25}$. Output of the laser beam is stopped at point $P_{24}$. Then, a linear movement is made therefrom to the next machining position of point $P_{26}$.

All of the movement paths from point $P_{20}$ to point $P_{26}$ constitute a smooth path. Therefore, the desired round hole can be formed by cutting with the laser beam turned on and off while the machining head is moving continuously without stopping in the middle of machining. As a result, a marked reduction in machining time period is realized.

However, the acceleration in the circular arc movement is increased in proportion to a square of the velocity, and so, when the machining speed is accelerated, the change in the acceleration cannot be disregarded. There exists a point where the acceleration largely varies even with the above-described smooth path. Such change in the acceleration causes the path of the machining head to vibrate and deteriorate machining accuracy.

For example, with regard to FIG. 8, the direction of the movement on the circular arc is reversed at point $P_{22}$. The acceleration in the case of the circular movement is directed toward the center of the circular arc, and, therefore, the direction of the acceleration changes by 180° at point $P_{22}$. Such a large change in the acceleration gives an impact on a moving shaft. The impact acting on the movement shaft gives adverse effect on a servo control system, causing the path of the machining head to be vibrated. The vibration of the path of the machining head will not cease immediately, and, therefore, the vibration occurring at point $P_{22}$ gives adverse effect on the path on the outer periphery of the round hole to be formed by cutting. As a result, the machining accuracy is adversely affected.

DISCLOSURE OF THE INVENTION

An object of the present invention is to provide a laser machining device which cuts a workpiece into a predetermined curved shape such as a round hole in accordance with the machining program, in which the machining program is designed so that a path leading to a machining path which corresponds to a machining shape of an object will not cause any significant change in the acceleration of a machining head passing through the path.

In order to achieve the above-described object, a laser machining device according to the present invention comprises: a movement path forming means for receiving data of a machining shape of an object to be cut by the laser machining device and forming a path reaching one predetermined point on a machining path in correspondence with the machining shape in a manner such that the path becomes a curve whose radius of a circular arc or radius of a curvature continuously or stepwisely becomes approximate to the radius of a circular arc or the radius of a curvature of a circle to be cut at said predetermined one point of the circle; and a machining program forming means for forming a machining program for cutting the workpiece to the desired machining shape by the laser machining device according to the data of the machining shape received by the movement path forming means and the curve formed by the movement path forming means.

The laser machining method according to the present invention comprises the following steps:

moving a machining head along a movement path whose radius of circular arc or radius of curvature continuously or stepwisely becomes approximate to the radius of a circular arc or the radius of a curvature of a machining path until reaching a first point situated on the machining path in correspondence with a desired machining shape to be cut by a laser machining device;

starting to output a laser beam at a start point of the path or at a midway point thereof while the machining head is moved along the path; and stopping to output the laser beam at a second point on the machining path after finishing the movement of the machining head along the machining path in correspondence with the desired machining shape.

As described above, according to the present invention, the machining head reaches the path corresponding to the circumference of the round hole to be cut by way of the curve having the radius of curvature designed to approach the radius of the round hole shape gradually or stepwisely, with the result that the change in the acceleration of the machining head moving on the path is restrained low so that impact acting on the machine can be controlled. As a result, high speed and high accuracy machining can be conducted without producing deviations from the intended machining shape due to vibration.

3

BEST MODE FOR CARRYING OUT THE INVENTION

Figure 1:
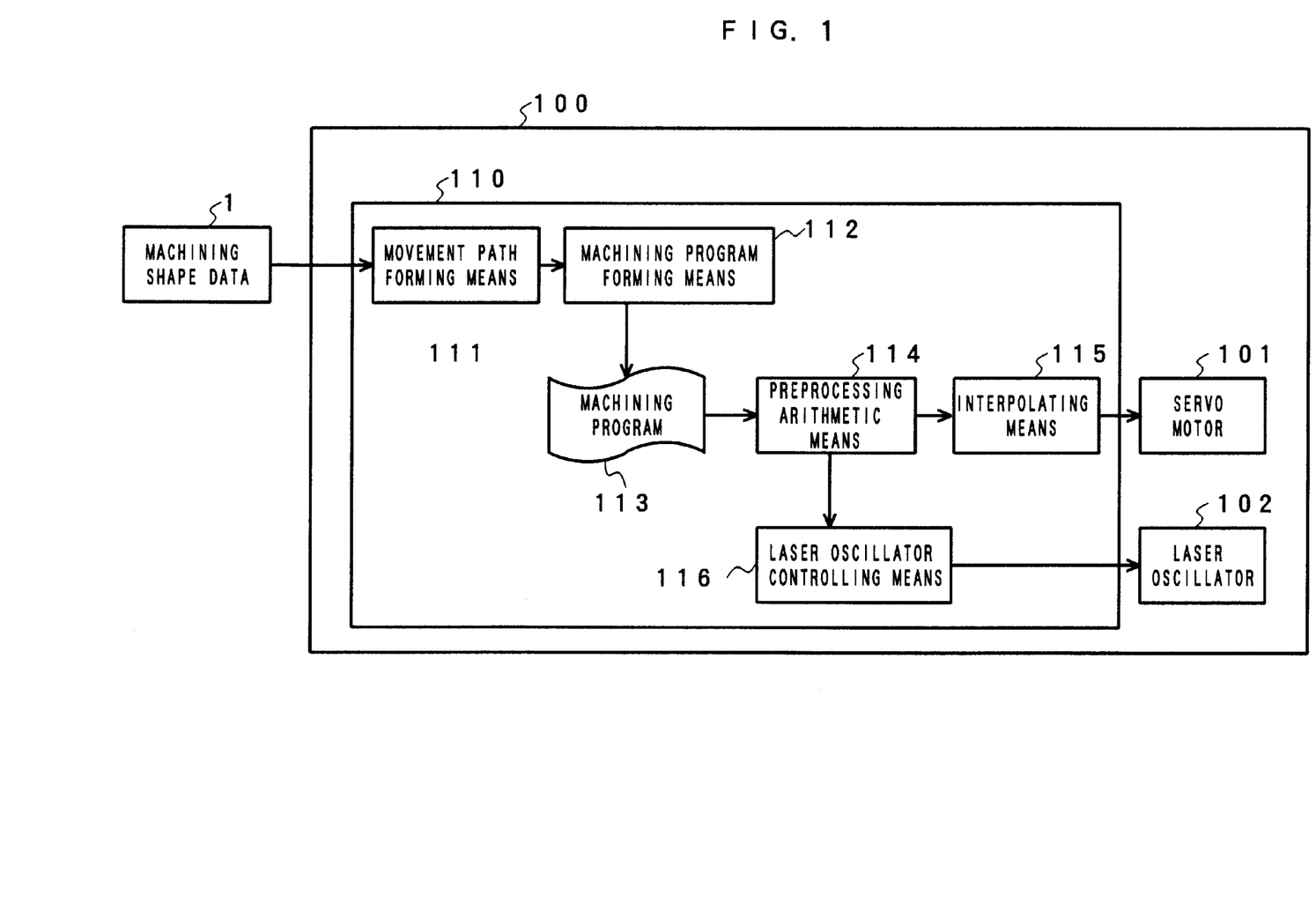
FIG. 1 is a block diagram showing constituent elements of a laser machining device according to the present invention.

An explanation will firstly be given of constituent elements of a laser machining device according to the present invention in reference to the block diagram of FIG. 1.

A laser machining device 100 is constituted of a numerical control device (CNC) 110, a servo motor 101 and a laser oscillator 102. A machining shape data 1 is read by a movement path forming means 111 in the numerical control device (CNC). The machining shape data 1 includes data with regard to a round hole to be cut by the laser oscillator 102, such as a radius of a round hole, coordinates of a center of the hole, a start point of cutting and the like. The movement path forming means 111 reads the machining shape data 1 and forms a movement path reaching a circumference of a circle to be cut for making a round hole in order to cut the round hole by the laser machining device 100. Incidentally, a specific form of the movement path (curve) will be described later in details.

A machining program forming means 112 prepares a machining program 113 for cutting the round hole shape by a movement path formed by the movement path forming means 111. The formed machining program 113 is decoded by a preprocessing arithmetic means 114. An interpolating means 115 controls the rotation of the servo motor 101 by outputting interpolation pulses to individual axes according to the movement command from preprocessing arithmetic means 114. Meanwhile, a laser oscillator controlling means 116 controls the output of a laser beam emitted from the laser oscillator 102 in accordance with a laser output command from the preprocessing arithmetic means 114.

Next, the entire constitution of a laser machining device according to the embodiment of the present invention will be described in reference to FIG. 2.

Figure 2:
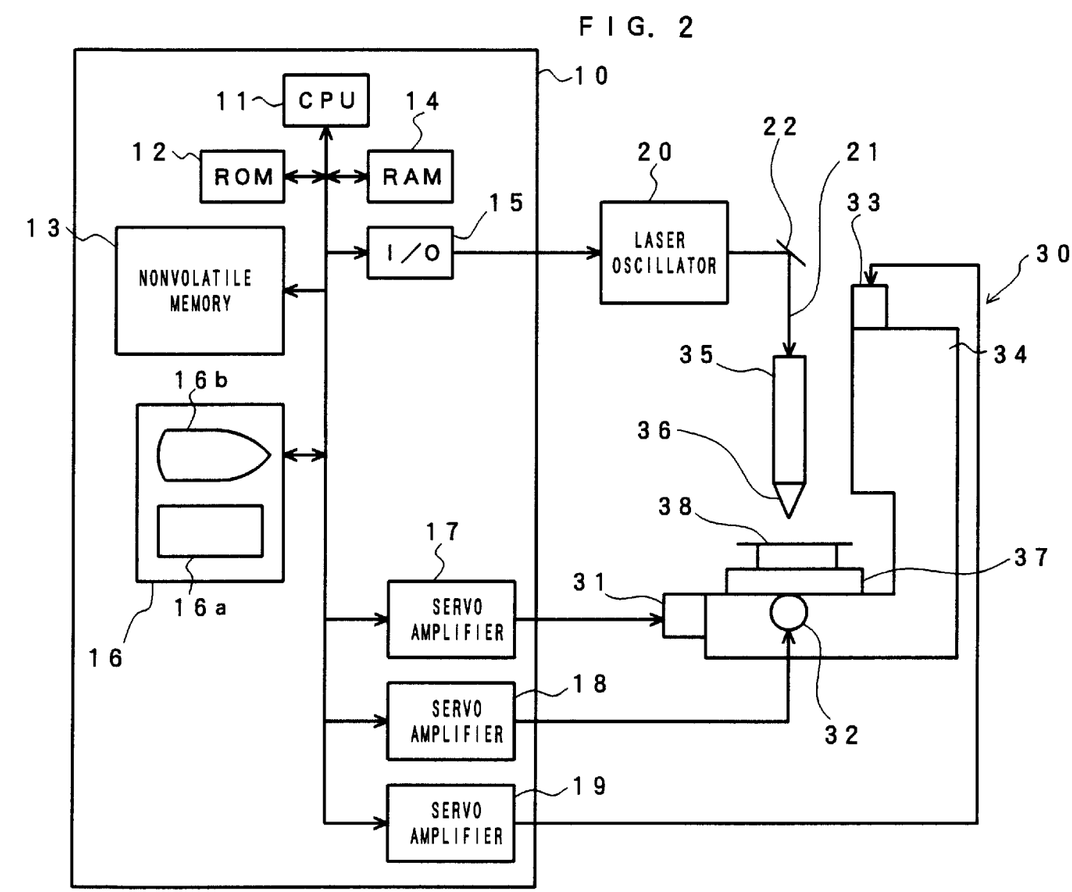
FIG. 2 is a diagram showing the entire constitution of the laser machining device to which the present invention is applied.

According to FIG. 2, the laser machining device is constituted of a numerical control device (CNC) 10, a laser oscillator 20 and a laser beam machine 30.

CNC 10 is constituted by a processor (CPU) 11, ROM 12, a nonvolatile memory 13, RAM 14, an input/output unit (I/O) 15, a display device with manual input unit (CRT/MDI) 16 and servo amplifiers 17, 18 and 19, all of which are connected to CPU 11 by buses.

4

EPROM or EEPROM is used for ROM 12, and a system program is stored therein. CMOS, backed up by a battery, is used for the nonvolatile memory 13, which stores machining programs, various parameters and the like to be held even after a power source is disconnected. CPU 11 reads the machining program based on a system program and controls the operation of the entire device.

The I/O unit 15 converts output control signals from the processor 11 and send them to the laser oscillator 20. The laser oscillator 20 emits a pulsating laser beam 21. The laser beam 21 is reflected by a bending mirror 22 and is sent to the laser beam machine 30.

The laser beam machine 30 is provided with a main body 34, a head 35 irradiating laser beam 21 onto a workpiece 38 and a table 37 on which the workpiece 38 is fixed. The laser beam 21 introduced into and condensed by the head 35, is irradiated from a nozzle 36 to the workpiece 38.

The laser machine main body 34 is provided with a servo motor 31 for controlling the movement of the table 37 in X-axis direction and a servo motor 32 for controlling the movement of the table 37 in Y-axis direction orthogonal to X-axis direction, whereby the table can be moved on the horizontal X-Y plane. Further, a servo motor 33, for controlling the movement of the head 35 in vertical Z-axis direction, is installed thereto. The servo motors 31, 32 and 33 are respectively connected to the serve amplifiers 17, 18 and 19 on the side of CNC 10, and their rotations are controlled in accordance with control signals from CPU 11. The table 37 is moved on the X-Y plane by the servo motors 31 and 32 in respect of the head 35. That is, the head 35 is moved relative to the table 37 along a predetermined path on the table 37. During the relative movement of the head, the laser beam 21 is irradiated from the nozzle 36 toward the workpiece 38 fixed onto the table 37. The laser beam 21 irradiated from the nozzle 36 makes a predetermined locus on the workpiece 38 in accordance with the movement of the table 37, thereby cutting the workpiece 38 into a predetermined shape.

Next, an explanation will be given of an example, in reference to FIG. 3, with respect to the case where in cutting a round hole by using the above-described laser machining device, a path reaching a circle to be cut for making a round hole is constituted of a spiral curve. Here, the spiral curve is referred to as a curve formed by gradually changing a radius of curvature thereof.

In order to make the round hole, machining shape data such as a radius of the round hole, the coordinates of the center and the like are instructed. The cutting speed, the position of piercing, roundness R of an approaching curve (for example, R1, R2 etc. as radii of circular arcs in FIG. 5, mentioned later) and the like may previously be set within CNC 10 as parameters or may be included in the machining shape data. A movement path is calculated based on the instructed shape data.

Figure 3:
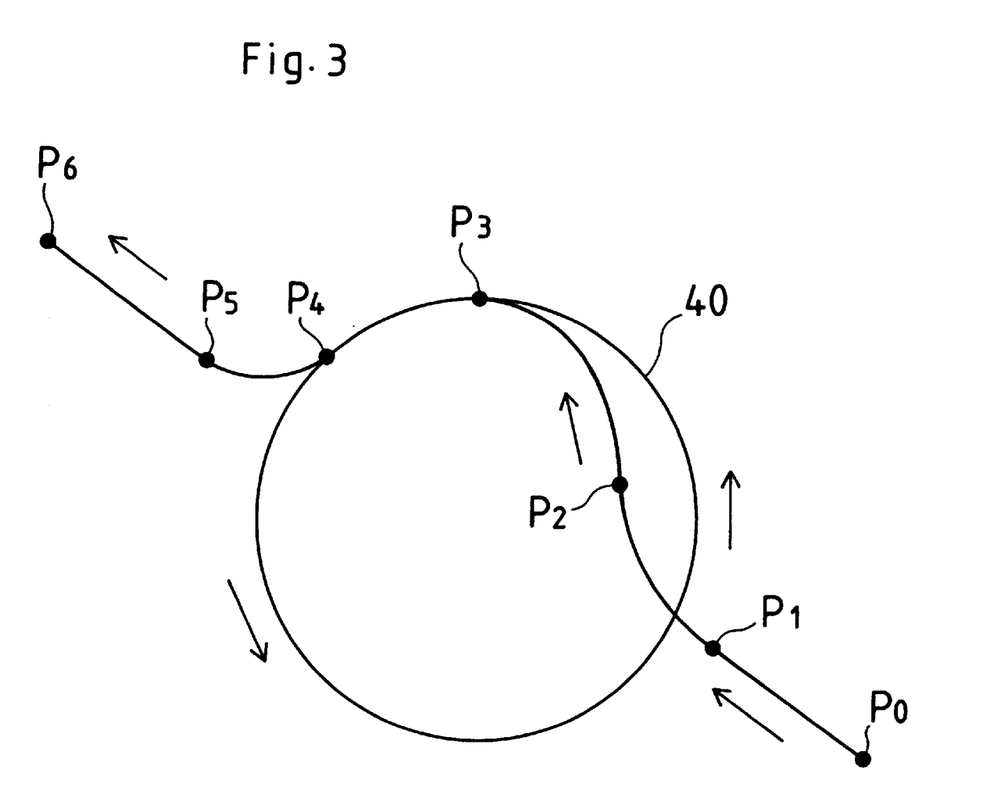
FIG. 3 is a diagram showing a machining path leading to a circumference of a circle to be cut by way of a spiral curve.

In respect of FIG. 3., a position of a machining head (not illustrated) prior to starting the cut of a round hole 40 is set to point $P_0$ and a position to start machining to an intended shape next to the machining for round hole 40 is set to point $P_6$. Further, the position of piercing is set to point $P_2$. With regard to the movement path, a linear movement is made from point $P_0$ to point $P_1$ and a circular movement is made from point $P_1$ to point $P_2$. A movement on a spiral curve is made from point $P_2$ to point $P_3$. The output of a laser beam is started at point $P_2$, and the moving velocity is decelerated (for example, to the velocity 0.8 times that of an original velocity).

The spiral curve comes into contact with the round hole (circle to be cut) 40 at point $P_3$. Further, the moving velocity which has been decelerated is restored to the original velocity at point $P_3$. The machining head makes a circular movement in the counterclockwise direction from point $P_3$ along the circle 40 to be cut, making a round to return again to point $P_3$. A circular movement from point $P_3$ to a point on the circle 40 to be cut is an overlapping circular movement. As a result, the round hole 40 is formed, and the output of the laser beam is stopped at point $P_4$ on the circle 40 to be cut.

The machining head leaves the circle 40 to be cut at point $P_4$, making a circular movement therefrom to point $P_5$. Then, the machining head makes a linear movement from point $P_5$ to point $P_6$ that is the start point of machining for a next machining shape.

Figure 4:
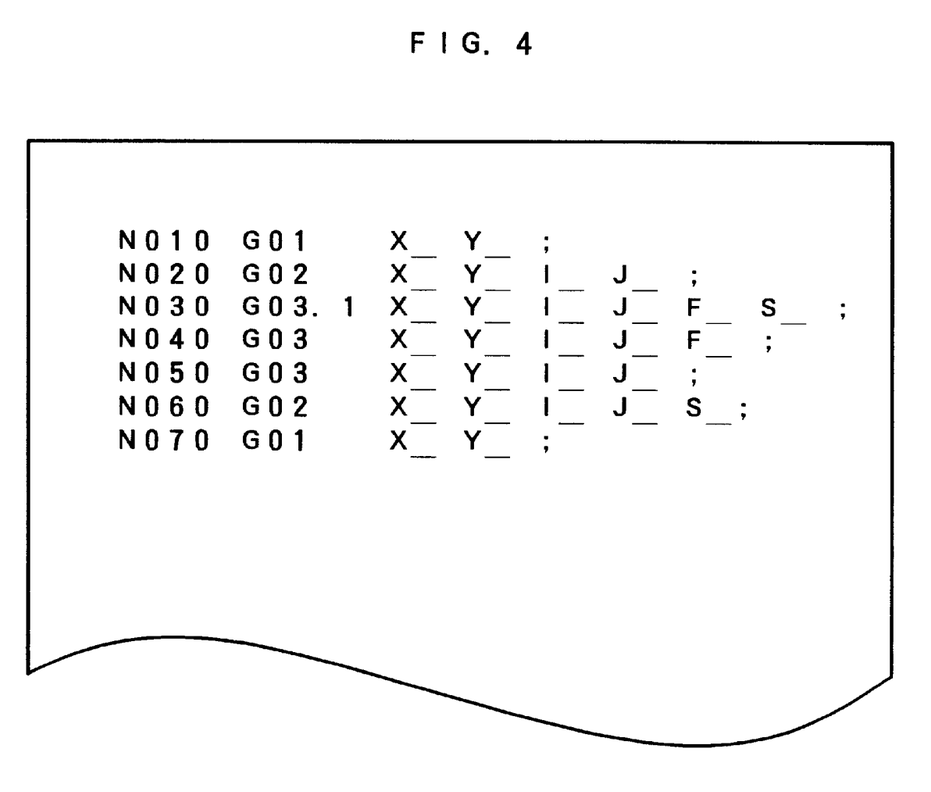
FIG. 4 is a diagram showing a program of the machining path leading to the circumference of the circle to be cut by way of the spiral curve.

When the above-described movement path is formed, a machining program for machining for the round hole is formed in accordance with the movement path. An example of the machining program is shown in FIG. 4. In FIG. 4, NO10 through NO70 designate sequence numbers; G01, a linear interpolation code; G02, a circular interpolation (clockwise) code; G03.1, a code for instructing a spiral curve (counterclockwise) (incidentally, a code for instructing a spiral curve in the clockwise direction is designated as G02.1); G03, a circular interpolation (counterclockwise) code; notations X, Y, an address indicating a target coordinate position; notation F, an address showing a feed velocity; and notation S, a set value of laser output.

In the machining program illustrated in FIG. 4, the relationship between respective blocks and movement paths are as follows:

A block of sequence number NO10 is a linear movement command for $P_0 \rightarrow P_1$ at a previously set cutting speed.

A block of sequence number NO20 is a circular movement command for $P_1 \rightarrow P_2$ in the clockwise direction centering on an instructed address (I, J).

A block of sequence number NO30 is a command for moving and machining along a spiral curve of $P_2 \rightarrow P_3$, centering on an instructed address (I, J) at a velocity instructed by the address F and at a laser oscillation speed instructed by the address S.

A block of sequence number NO40 is a command for moving and machining on a circumference of the round hole 40 or $P_3 \rightarrow P_3$, centering on an instructed address (I, J) as a velocity instructed by the address F.

A block of sequence number NO50 is a circular movement command for $P_3 \rightarrow P_4$, centering on the instructed address (I, J).

A block of sequence number NO60 is a circular movement command for $P_4 \rightarrow P_5$, centering on an instructed address (I, J) at a laser oscillation speed instructed by an address S (null in this case).

A block of sequence number NO70 is a linear movement command for $P_5 \rightarrow P_6$.

By carrying out the machining in accordance with this machining program, a change in the acceleration at point $P_2$, the position of piercing, can be reduced, and the impact can be alleviated as a result. That is, in the case of the circular movement from point $P_1$ to point $P_2$, the acceleration is directed toward the center of the circular arc, and the magnitude of the acceleration is inversely proportional to the radius of curvature and is proportional to the square of the velocity. On the other hand, the radius of curvature is relatively large in the vicinity of the start point (Point $P_2$) of movement in the case of the movement path of the spiral curve extending from point $P_2$ to point $P_3$, and thus the acceleration is reduced. However, the direction of the acceleration is substantially reverse to the direction of the acceleration in the case of the circular movement from point $P_1$ to point $P_2$. Thus, a change in the acceleration immediately before reaching point $P_2$ and the change in the acceleration immediately after passing point $P_2$ can be reduced. Furthermore, with respect to the movement path of the spiral curve from point $P_2$ to point $P_3$, if the moving velocity is reduced, the acceleration can be reduced throughout the path, and, as a result, the change in the acceleration at immediately before and after point $P_2$ can further be reduced.

In this way, the machining accuracy can be improved by reducing the change in the acceleration of the moving machining head. A result of comparison between the machining accuracy of the round hole cut by the conventional movement path and that attainable by the present invention is shown in FIG. 8.

First, a round hole was cut in accordance with a conventional movement path. The circularity in this case was 150 $\mu$m. The circularity is defined here as a difference between a minimum circumscribed circle and a maximum inscribed circle of an actual shape. Next, the same round hole was cut with no deceleration applied during a spiral curve movement in accordance with the path illustrated in FIG. 3. The circularity in this case was 100 $\mu$m. Furthermore, when the velocity in the spiral curve movement in accordance with the path illustrated in FIG. 3 was reduced by 20%, the circularity of 70 $\mu$m was obtained.

In this way, by reducing the change in the acceleration of the moving machining head, the impact acting on the machine can be reduced, and the adverse effect on the machining shape can also be reduced. Furthermore, an excessive load on a motor is a factor responsible for the instability of control, but the instability of the control can be improved by restraining the change in the acceleration. As a result, high accuracy machining can be realized at high speed.

Incidentally, in the case of the example of FIG. 4, G03.1 is the movement command for the spiral curve, but G02 and G03, which are the commands for circular movements in the clockwise and the counterclockwise directions, may be used as the commands for spiral curve movement. That is, when the position of the end point of the circular arc does not fall on the circumference of circle according to the circular movement command, the movement is made following a spiral curve from the start point to the end point.

Figure 5:
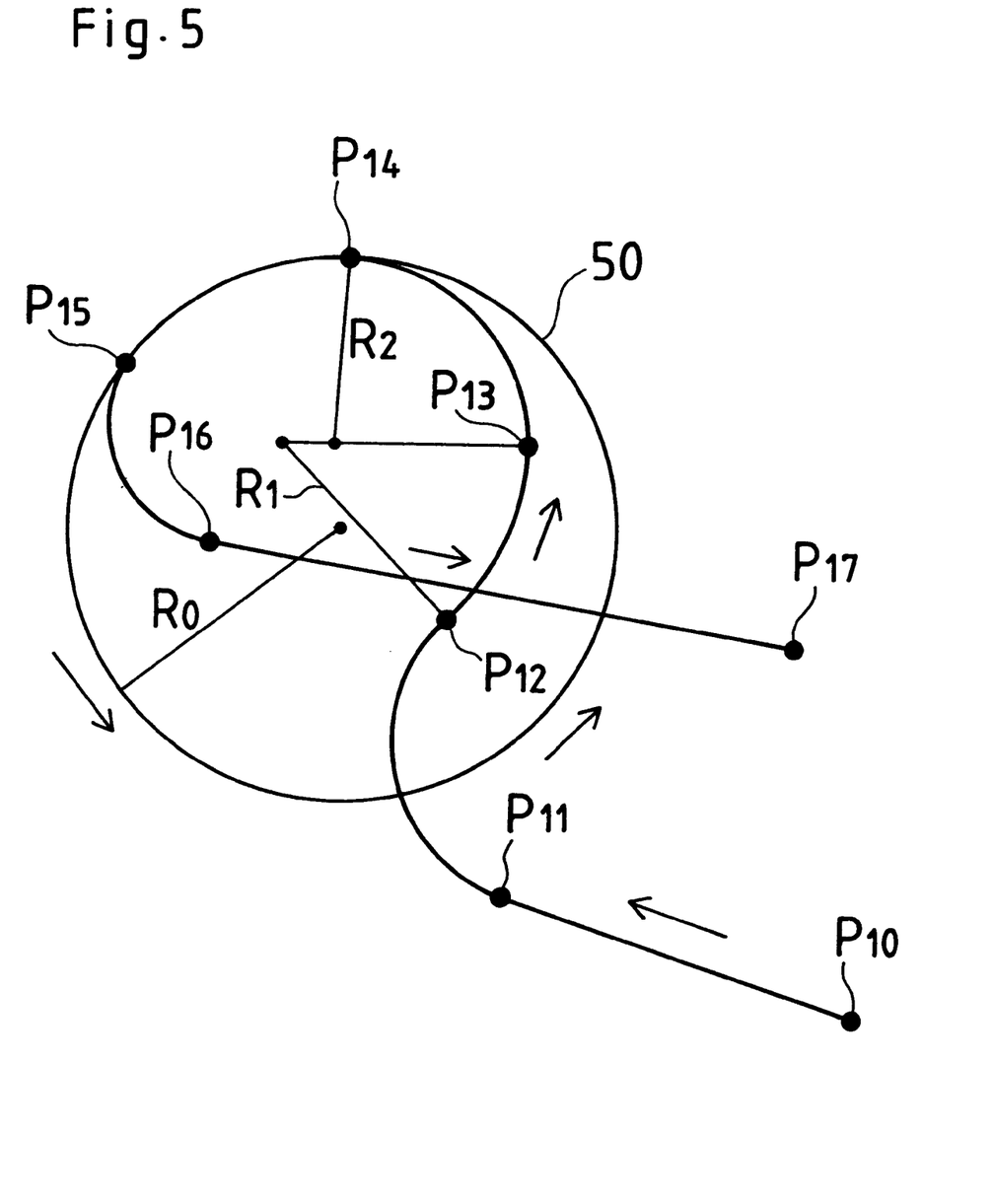
FIG. 5 is a diagram showing a machining path leading to a circumference of a circle to be cut by way of a plurality of circular arcs.

Next, described in the following in reference to FIG. 5 is a case where, in cutting a round hole by using the laser machining device, a path leading to a circle for cutting a round hole is constituted of a combination of a plurality of circular arcs.

In FIG. 5, a position of the machining head before starting to cut a round hole 50 is set to point $P_{10}$, and the position to start the machining for an intended machining shape next to the machining for the round hole 50 is set to point $P_{17}$. Further, the position of piercing is set to point $P_{12}$.

According to the movement path, a linear movement is made from point $P_{10}$ to point $P_{11}$, and a circular movement is made from point $P_{11}$ to point $P_{12}$. Further, a circular movement is made from point $P_{12}$ to point $P_{13}$, radius R1 of the circular arc being smaller than the radius R0 of the round hole 50 (R1<R0). Also, a circular movement is made from point $P_{13}$ to point $P_{14}$, the radius R2 of the circular arc being smaller than the radius R1 of the circular arc in a segment from point $P_{12}$ to point $P_{13}$ (R2<R1).

The moving velocity is decelerated when the output of a laser beam is started at point $P_{13}$ (for example, to a velocity 0.8 times that of an original velocity), and, under this state, the machining head reaches point $P_{14}$ on the periphery of round hole (circle to be cut) 50. The movement makes a round in the counterclockwise direction from point $P_{14}$ on the circle 50 to be cut along the circle to be cut and returns again to point $P_{14}$ and progresses further to point $P_{15}$ on the circle 50 to be cut. The movement from point $P_{14}$ to point $P_{15}$ is a circular movement for an overlapped portion, thereby making the round hole 50.

The output of laser beam is stopped at point $P_{15}$. Then, the movement path leaves the circle 50 to be cut at point $P_{15}$ and a circular movement is continued therefrom to point $P_{16}$. Then, a linear movement is made from point $P_{16}$ to the position $P_{17}$, the start point of machining for a succeeding machining shape.

Figure 6:
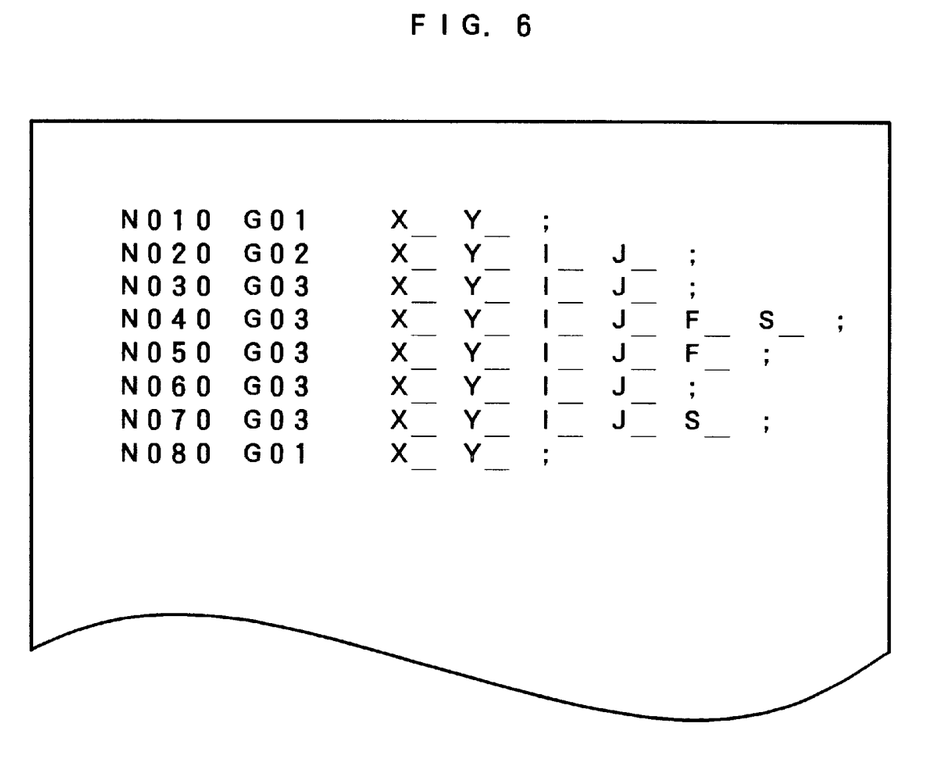
FIG. 6 is a diagram showing a machining program of the machining path leading to the circumference of the circle to be cut by way of the plurality of circular arcs.

When the movement paths illustrated in FIG. 5 are formed as described above, a machining program for making the round hole is formed in accordance with the movement paths. An example of the machining program is shown in FIG. 6. In the machining program, the relationship between respective blocks and the movement paths is as shown in FIG. 6.

The block of sequence number NO10 is a linear movement command for a section of $P_{10} \rightarrow P_{11}$ at a predetermined cutting speed.

The block of sequence number NO20 is a circular movement command for a section of $P_{11} \rightarrow P_{12}$ centering on an instructed address (I, J).

The block of sequence number NO30 is a circular movement command for a section of $P_{12} \rightarrow P_{13}$ centering on an instructed address (I, J).

The block of sequence number NO40 is a circular movement command for a section of $P_{13} \rightarrow P_{14}$ centering on an instructed address (I, J) at a velocity instructed by an address F and turning ON the laser at a laser oscillation speed instructed by an address F.

The block of sequence number NO50 is a movement command for movement on a circumference of the round hole 50 of $P_{14} \rightarrow P_{14}$ centering on an instructed address (I, J) at a velocity instructed by an address F.

The block of sequence number 60 is a circular movement command for a section of $P_{14} \rightarrow P_{15}$ centering on the instructed address (I, J).

The block of sequence number NO70 is a circular movement command for a section of $P_{15} \rightarrow P_{16}$ centering on an instructed address (I, J) at a laser oscillation speed instructed by an address S (null in this case; laser is turned OFF).

The block of sequence number NO80 is a linear movement command for a section $P_{16} \rightarrow P_{17}$.

By performing the machining operation in accordance with this machining program, the changes in the accelerations at point $P_{12}$ of piercing position, point $P_{13}$ where output of the laser beam is started and at point $P_{14}$ where the movement path reaches the circle to be cut, can respectively be reduced so that impact can be alleviated. That is, the center of the circular arc of the segment from point $P_{11}$ to point $P_{12}$, and the center of the circular arc of the segment from point $P_{12}$ to point $P_{13}$ are opposite to each other with respect to the movement paths ($P_{11} \rightarrow P_{12} \rightarrow P_{13}$). Therefore, in general, a large change in the acceleration occurs at point $P_{12}$, that is the junction of the two circular arcs, since the direction of acceleration changes at this point; however, according to the present invention, the circular arc immediately following the point $P_{12}$ (that is, circular arc of the segment of point $P_{12}$ to point $P_{13}$) has a large radius R1, and, thus, the acceleration is reduced. As a result, no rapid change in the acceleration occurs at point $P_{12}$. Further, in respect of the circular arc of the segment from point $P_{12}$ to point $P_{13}$ and the circular arc of the segment from point $P_{13}$ to point $P_{14}$, centers thereof are on the same side with respect to the movement paths ($P_{12} \rightarrow P_{13} \rightarrow P_{14}$), and the radii of the circular arcs change only from R1 to R2; therefore, a change in the acceleration is relatively small at point $P_{13}$, that is the junction of these two circular arcs. Furthermore, in respect of the circular arc of the segment from point $P_{13}$ to point $P_{14}$, its radius R2 is more approximate to the radius R0 of the round hole 50 (compared with the radius R1 of the circular arc of the segment from point $P_{12}$ to point $P_{13}$), and the center of the circular arc is at the inside of the circle 50 to be cut and accordingly, the change in the acceleration on the circle 50 to be cut immediately after passing point $P_{14}$ from the acceleration immediately before reaching point $P_{14}$ on the circle 50 to be cut is small.

In this way, the change in the acceleration of the moving machining head can be reduced by moving the machining head onto the path (circle to be cut) coinciding with the circumference of the round hole 50 by way of a plurality of circular arcs having different radii, and, in this way, the machining accuracy can also be improved. Incidentally, according to this example, there are two circular arcs within a section from point $P_{12}$ to point $P_{14}$; however, the number of the circular arcs may be 3 or more.

With the laser machining device as described above, the laser machining operation having a small change in the acceleration can be realized by simply instructing the machining shape of the round hole.

The machining program of the above-described movement paths can be formed by an automatic programming means incorporated into a laser machining device. Here, the construction of such an automatic programming means is described schematically in reference to a block diagram of FIG. 7.

Figure 7:
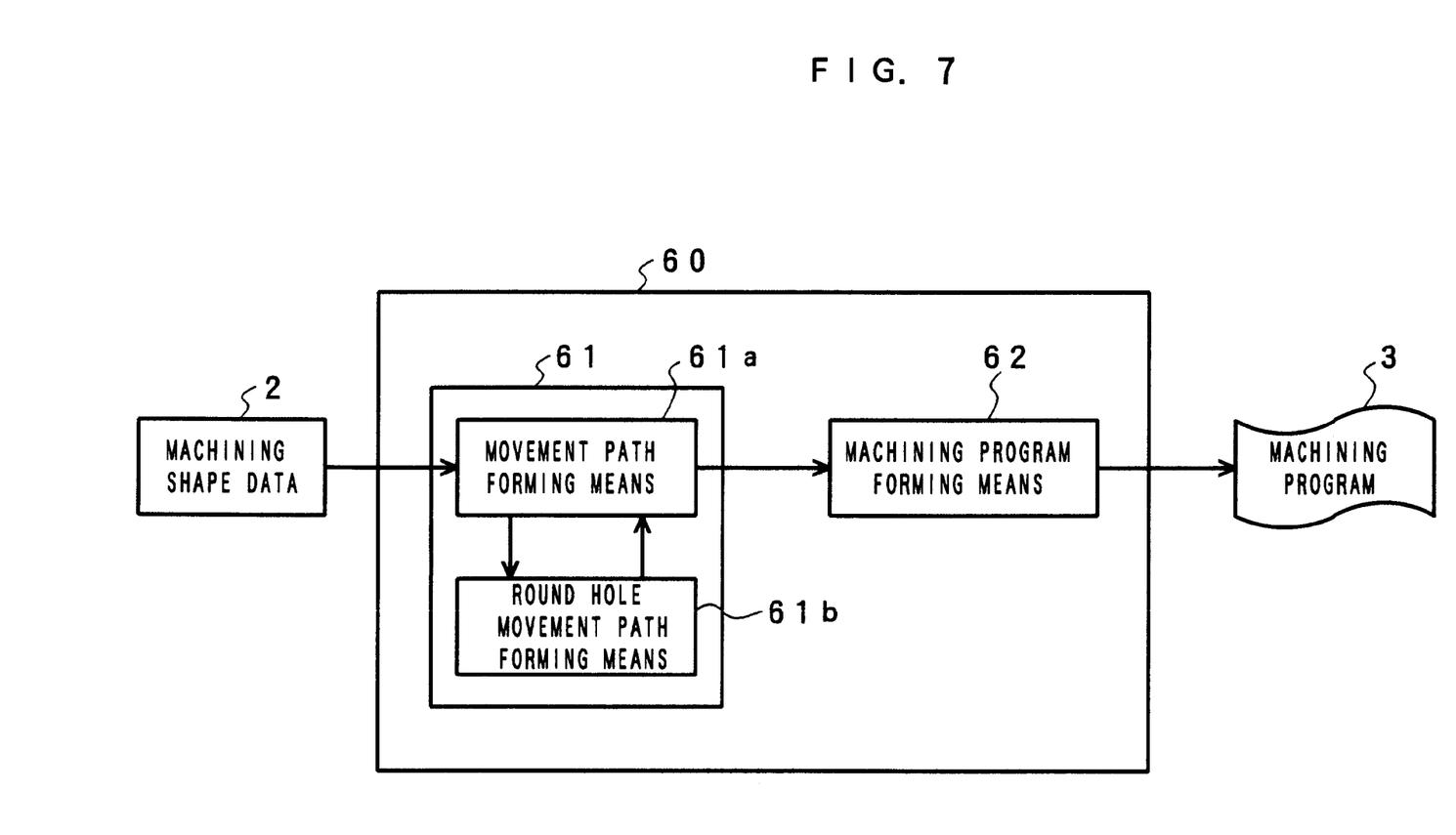
FIG. 7 is a block diagram showing the constitution of an automatic programming means provided to a laser machining device according to the present invention.

Referring to FIG. 7, a movement path forming means 61 of an automatic programming means 60 is constituted of a general movement path forming means 61a and a round hole movement path forming means 61b.

A machining shape data 2 includes shape data of a round hole and other various shape data. The general movement path forming means 61a in the automatic programming means 60 not only calculates movement paths for continuously machining to a plurality of machining shapes but also provides the shape data of a round hole to the round hole movement path forming means 61b.

When the round hole movement path forming means 61b receives the shape data of a round hole, it forms movement paths including that of a circle to be cut corresponding to the shape of the round hole by way of curves whose radii of curvatures gradually approaching the radius of the round hole shape. The data of the movement paths are provided to the general movement path forming means 61a. The general movement path forming means 61a calculates an entire movement path based on the movement path of the round hole calculated by the round hole making movement path forming means 61b.

A machining program forming means 62 forms a machining program 3 in accordance with the movement paths calculated by the general movement path forming means 61a. A machining operation much less affected by the change in acceleration can be realized by operating the laser machining device according to this machining program 3.

Furthermore, the movement path forming means of the laser machining means may be constituted of a general movement path forming means and a round hole moving path forming means, in the same way as the movement path forming means 61 of the automatic programming means 60.

What is claimed is:

1. A laser machining device for cutting a workpiece to predetermined curved machining shapes including a round hole or the like in accordance with a machining program, said device including:

a movement path forming means for receiving data of a machining shape of an object to be cut by the laser machining device and forming a path reaching one predetermined point on a machining path in correspondence with the machining shape in a manner such that the path becomes a curve whose radius of a circular arc or radius of a curvature continuously or step wise becomes approximate to the radius of a circular arc or the radius of a curvature of a circle to be cut at said predetermined one point of the circle without shifting the center of the circular arc or the center of the curvature of the path from one side of the path to the other side thereof; and a machining program forming means for forming a machining program for cutting the workpiece to the desired machining shape by the laser machining device according to the data of the machining shape received by the movement path forming means and the curve formed by the movement path forming means.

2. The laser machining device according to claim 1, wherein a start point of the curve formed by the movement path forming means is a hole previously perforated at one point on the workpiece.

3. The laser machining device according to claim 1, wherein the movement path forming means comprises a general movement path forming means and a round hole making machining path forming means;

the general movement path forming means has a function for calculating a movement path for continuously machining a plurality of machining shapes and a function for providing the shape data of the round hole to the round hole making machining path forming means; and the round hole making machining path forming means has a function for forming a path reaching one predetermined point on the machining path for making the round hole based on the shape data of the round hole received from the general movement path forming means in a manner such that the path becomes a curve whose radius of a circular arc or radius of a curvature continuously or step wise becomes approximate to a radius of the round hole.

4. A laser machining device for cutting a workpiece to predetermined curved machining shape including a round hole or the like in accordance with a machining program, said device being provided with an automatic programming means, comprising:

a general movement path forming means for forming cutting paths for various shapes except for a shape of the round hole and movement paths connecting the various shapes to be cut when a machining shape data including the shape data of the round hole is inputted;

a round hole movement path forming means for forming a smooth round hole movement path leading to a path coinciding with the circumference of the round hole by way of a path whose radius of curvature gradually becomes approximate to the radius of the round hole, without shifting the center of the curvature of the path from one side of the path to the other side thereof, according to the data of the round hole in the machining shape data; and a machining program forming means capable of forming a machining program for cutting to all the machining shapes based on said general movement paths and the round hole movement path.

5. A laser machining method comprising the steps of:

moving a machining head along a movement path whose radius of circular arc or radius of a curvature continuously or step wise becomes approximate to the radius of a circular arc or the radius of a curvature of a machining path, without shifting the center of the circular arc or the center of the curvature of the path from one side of the path to the other side thereof, until reaching a first point situated on the machining path in correspondence with a desired machining shape to be cut by a laser machining device;

starting to output a laser beam at a start point of the path or at a midway point thereof while the machining head is moved along the path; and stopping to output the laser beam at a second point on the machining path after finishing the movement of the machining head along the machining path in correspondence with the desired machining shape.

6. The laser machining method according to claim 5, wherein a movement velocity of the machining head on the path leading to the first point of the machining path, in correspondence with the machining shape of the object to be cut by the laser machining device, is lower than the movement velocities on sections immediately preceding and immediately following said path.

* * * * *

UNITED STATES PATENT AND TRADEMARK OFFICE
CERTIFICATE OF CORRECTION

PATENT NO.  : 5,910,261
DATED       : June 8, 1999
INVENTOR(S) : Atsushi MORI, et al.

It is certified that error appears in the above-identified patent and that said Letters Patent is hereby corrected as shown below:

[86] §371 Date: change "May 29, 1996" to --May 29, 1997--.

[86] §102(e) Date: change "May 29, 1996" to
     --May 29, 1997--.

Signed and Sealed this

Eleventh Day of April, 2000

Attest:

Q. TODD DICKINSON

Attesting Officer

Director of Patents and Trademarks